United States Patent [19]

Bindler

[11] Patent Number: 6,135,016
[45] Date of Patent: Oct. 24, 2000

[54] CHOCOLATE PLANT

[75] Inventor: Uwe Bindler, Bergneustadt, Germany

[73] Assignee: Gebr, Bindler Maschinenfabrik GmbH & Co. KG, Bergneustadt, Germany

[21] Appl. No.: 09/258,685

[22] Filed: Feb. 26, 1999

[30] Foreign Application Priority Data

Mar. 6, 1998 [DE] Germany ............ 198 09 651

[51] Int. Cl.⁷ ................................................ A23L 1/00
[52] U.S. Cl. ........................ 99/486; 99/493; 99/646 R
[58] Field of Search ........................ 99/342, 427, 484, 99/348, 485, 493, 516, 646 R; 104/88.02; 141/129; 222/381; 198/349, 350, 358; 118/16, 14, 25; 414/404, 403, 416, 273; 426/231

[56] References Cited

U.S. PATENT DOCUMENTS

| | | | |
|---|---|---|---|
| 3,536,236 | 10/1970 | Rasmusson. | |
| 3,663,231 | 5/1972 | Tourell | 99/485 |
| 3,682,086 | 8/1972 | Ocker | 99/485 |
| 3,955,489 | 5/1976 | Goeling et al. | 426/631 X |
| 4,620,477 | 11/1986 | Ripani et al. | 99/486 |
| 4,679,498 | 7/1987 | Chaveron et al. | 99/483 |
| 5,478,184 | 12/1995 | Bryant et al. . | |
| 5,657,687 | 8/1997 | Callebaut et al. | 99/472 X |
| 5,814,362 | 9/1998 | Muntener | 426/231 |

FOREIGN PATENT DOCUMENTS

| | | |
|---|---|---|
| 0 559 401 A2 | 9/1993 | European Pat. Off. . |
| 0 563 692 A2 | 10/1993 | European Pat. Off. . |
| 94 19 075 | 2/1995 | Germany . |

*Primary Examiner*—Timothy Simone
*Attorney, Agent, or Firm*—Proskauer Rose LLP

[57] ABSTRACT

A plant for producing foodstuffs is particularly suited for use as a chocolate plant, and permits facilitated tailoring thereof for a particular production purpose by including at least two sections, at least a portion of which are mechanically independent of one another. The foodstuffs are advantageously processable and/or conveyable in product carriers, and optionally delivered from one section to another by transfer devices located therebetween. Optionally, intermediate storage devices may also be provided between the portion of the sections which are mechanically independent of one another.

22 Claims, 1 Drawing Sheet

CHOCOLATE PLANT

BACKGROUND OF THE INVENTION

The invention relates to a plant for producing foodstuffs, in particular a chocolate plant, comprising at least two sections, with the foodstuffs in the sections preferably being processable and/or conveyable in product carriers.

The chocolate plants known from the state of the art are always built as entire plants comprising various sections, e.g. mold changing sections, warming-up sections, refrigeration sections and mold release sections. The known plants are tailor-made for a particular purpose, e.g. for producing Advent calendars, for producing chocolate bars or similar products. As a rule, reconfiguring the known plant from a plant for producing Advent calendars to a plant for producing chocolate bars is expensive, and sometimes even impossible. However, due to their special design, the known chocolate plants achieve high rates of throughput when producing those products for which a particular plant is tailor-made.

A problem of the known chocolate plants is that their purchase is only justified if the products produced can be sold in large batches. This is problematic, in particular, when a new product is introduced in the market, since, in the case of chocolate plants known from the state of the art, a new chocolate plant has to be invested in, without the market success of the new product being foreseeable, because existing chocolate plants cannot be reconfigured economically. Thus the introduction of new products is associated with a relatively high economic risk. Furthermore, nowadays a good market exists for individual products made in small batches and for seasonal products. In either case a chocolate plant specifically bought for the respective product becomes profitable only after a relatively extended period of use.

Based on the above-mentioned problems, it is the object of the invention to provide a plant for producing foodstuffs, in particular a chocolate plant, which ensures flexible production of usually small batches of various products.

SUMMARY OF THE INVENTION

According to the invention, the above-mentioned object is met in that the sections, at least in part, are mechanically independent of each other. The mechanical independence of the sections, as realized according to the invention, makes possible an individual arrangement of a plant, matched to the product to be produced, on site, at the foodstuffs producer.

The individual arrangement of a chocolate plant according to the invention is further facilitated in that the mechanically independent sections are moveable in relation to each other, in particular moveable on wheels. Respective devices provided at the sections thus allow reconfiguration of an existing chocolate plant in a very short time.

Since, according to a further embodiment of the invention, the mechanically independent sections can be started up independently of each other, there is the further option of leaving the layout of a plant unchanged and merely starting up or shutting down individual sections, thus adapting the functionality of the overall plant.

In chocolate plants configured according to the invention, optimal control of the production process is ensured in that the mechanically independent sections are interconnected by electrical status and speed control systems for serial or parallel information exchange.

Further flexibility of a plant configured according to the invention is achieved in that transfer devices, e.g. robots or pneumatic transposition devices, are provided for delivering the foodstuffs, which are preferably arranged in product carriers, between the sections which are mechanically independent of each other. On the one hand these transfer devices can be used merely for delivering the foodstuffs between adjacent, mechanically independent, sections; on the other hand, transfer devices can also be used to bridge entire sections, depending on requirements. Bridging individual sections makes it unnecessary to reconfigure the entire plant.

To optimise the capacity of the various sections it is further advantageous to provide intermediate storage devices between the sections which are mechanically independent of each other.

Despite the multitude of configuration options, automatic control of the production process of a plant configured according to the invention is ensured in that the sections which are mechanically independent of each other, at least in part comprise machine-readable markers, in particular transponders. By means of these, the plant control system can recognize a given arrangement and thus automatically take corresponding measures for process control.

The production process is further improved in that the product carriers for the foodstuffs, in particular for the chocolate, also comprise machine-readable markers. Here again, transponders are suitable for machine-readable marking. Error conditions can easily be detected if sensors, in particular cameras, are provided for status monitoring of the plant.

The actual state of the production process can be monitored at any time if in the way of sensors, at least in part, reading devices for the machine-readable markers of the product carriers are arranged at the sections which are mechanically separated from each other. This even provides the option of changing over the plant according to the invention to another product while the production process is under way.

There are a host of possibilities for configuring and improving in detail the plant for producing foodstuffs, according to the invention, in particular a chocolate plant. Such embodiments are explained both in the subordinate claims following claim 1 as well as in the description of a preferred embodiment in conjunction with the drawing. The sole figure of the drawing diagrammatically shows a top view of an embodiment of a chocolate plant according to the invention.

The embodiment of a chocolate plant configured according to the invention, shown in the sole figure, is configured in such a way that chocolates with filling can be made in this plant.

DETAILED DESCRIPTION OF THE PREFERRED EMBODIMENT

Figure 1:
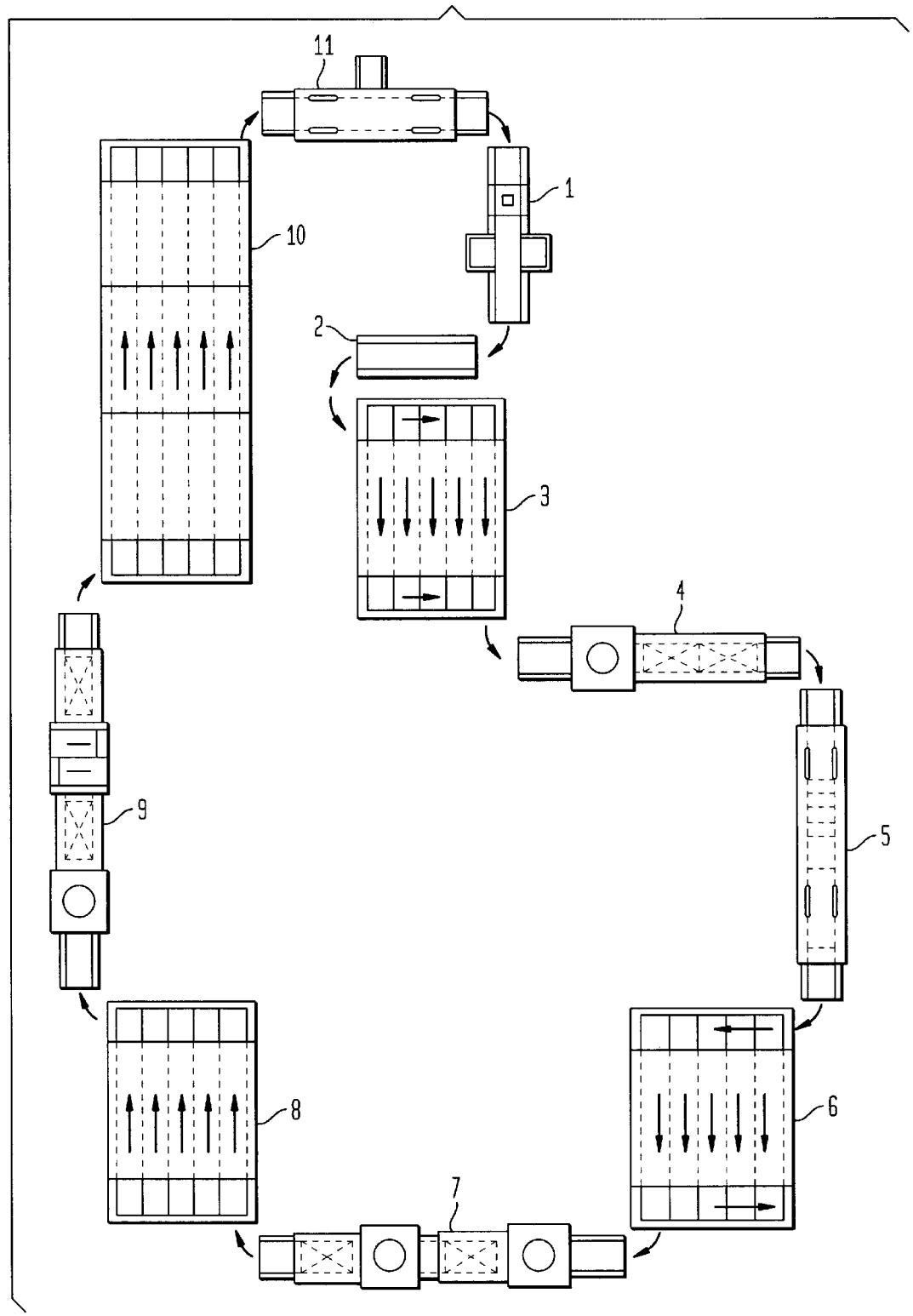
FIG. 1 is a schematic plan view of a plant for producing foodstuffs in accordance with an embodiment of the invention.

Referring now to FIG. 1, a plant for producing foodstuffs is appropriately configured as a chocolate plant.

For producing chocolates with filling, the chocolate plant shown comprises a mold changing section 1. The mold changing section 1 is connected to a line equalizing section 2 via a transfer device (not shown). The line equalising section 2 in turn is connected to a mold warming-up section 3 by way of a transfer device (not shown). The mould warming-up section 3 is followed by an apportioning and vibration section 4 where the chocolate mass is filled into the molds (not shown) representing the product carriers, and where subsequently the chocolate mass is homogenised by vibration. The apportioning and vibration section 4 is followed by a shell forming section 5. The necessity for forming shells stems from the requirement to produce chocolate with a filling. Subsequently, shell forming is continued in a refrigeration section 6. After this, in an apportioning section 7, the filling is inserted into the shells which have formed in this way within the chocolate. Subsequently, cooling of the filling takes place in a further refrigeration section 8. The subsequent capping section 9 provides a cap for the filled chocolates. Then the finished chocolates are conveyed from the capping section 9 to a final refrigeration section 10 and finally into a mold release section 11 where the production loop is closed and the mold is conveyed to the mold changing section 1.

The embodiment of a chocolate plant according to the invention as shown in the figure demonstrates that this chocolate plant can easily be reconfigured for the production of chocolates without filling. This merely requires shutting down the shell forming section 5, the refrigeration section 6, the apportioning section 7, the further refrigeration section 8 and the capping section 9. In addition, the apportioning and vibration section 4 directly conveys the molds (not shown) to the final refrigeration section 10. Such direct transfer of the molds from the apportioning and vibration section 4 to the final refrigeration section 10 can for example take place simply by moving the apportioning and vibration section 4.

The above description of an embodiment of a chocolate plant according to the invention demonstrates the high degree of flexibility of such a chocolate plant.

What is claimed is:

1. A plant for producing foodstuffs, comprising:
    at least two sections positionally arranged relative one another, the foodstuffs being transferred from one of the sections to another of the sections in sequential manner, a particular operation being performed on the foodstuffs at each of the sections, at least a portion of said sections being mechanically independent of one another.

2. A plant according to claim 1, wherein the plant is suitably configured for operation as a chocolate plant.

3. A plant according to claim 1, wherein the foodstuffs in the sections are processable in product carriers.

4. A plant according to claim 1, wherein the foodstuffs are conveyable between the sections in product carriers.

5. A plant according to claim 1, wherein at least one section of said portion of the sections which is mechanically independent of one another is positionably moveable.

6. A plant according to claim 5, wherein said at least one section includes wheels to permit positional movement thereof.

7. A plant according to claim 1, wherein the portion of the sections which are mechanically independent of one another can be started up and operated independently.

8. A plant according to claim 1, wherein the portion of the sections which are mechanically independent of one another are interconnected by electrical status and speed control systems for information exchange.

9. A plant according to claim 8, wherein said information exchange is conducted serially.

10. A plant according to claim 8, wherein said information exchange is conducted in parallel.

11. A plant according to claim 1, further comprising at least one transfer device for delivering the foodstuffs, positionally located between the portion of the sections which are mechanically independent of one another.

12. A plant according to claim 11, wherein said at least one transfer device includes at least one robotic device.

13. A plant according to claim 11, wherein said at least one transfer device includes at least one pneumatic transposition device.

14. A plant according to claim 4, further comprising at least one transfer device for delivering the foodstuffs positionally located between the portion of the sections which are mechanically independent of one another.

15. A plant according to claim 1, further comprising at least one intermediate storage device positionally located between the portion of the sections which are mechanically independent of one another.

16. A plant according to claim 1, wherein at least one of the portion of the sections which are mechanically independent of one another includes a machine-readable marker.

17. A plant according to claim 16, wherein the machine-readable marker includes a transponder.

18. A plant according to claim 1, wherein the product carriers comprise machine-readable markers.

19. A plant according to claim 18, wherein the machine-readable markers include transponders.

20. A plant according to claim 1, further comprising sensors for status monitoring of the plant.

21. A plant according to claim 20, wherein said sensors include cameras.

22. A plant according to claim 18, further comprising reading devices for the machine readable markers of the product carriers, at least one of the reading devices being arranged at the portion of the sections which are mechanically independent of one another.

* * * * *